A. W. SAEGESSER.
LOCK FOR HUB CAPS.
APPLICATION FILED OCT. 2, 1919.

1,396,884.

Patented Nov. 15, 1921.

Inventor
Albert W. Saegesser,
By H. M. Plaisted,
Attorney.

UNITED STATES PATENT OFFICE.

ALBERT W. SAEGESSER, OF GRANITE CITY, ILLINOIS, ASSIGNOR TO LIBERTY AUTO LOCK CO., OF ST. LOUIS, MISSOURI, A CORPORATION OF MISSOURI.

LOCK FOR HUB-CAPS.

1,396,884.     Specification of Letters Patent.     Patented Nov. 15, 1921.

Application filed October 2, 1919. Serial No. 327,989.

*To all whom it may concern:*

Be it known that I, ALBERT W. SAEGESSER, a citizen of the United States, residing at Granite City, in the county of Madison and State of Illinois, have invented certain new and useful Improvements in Locks for Hub-Caps, of which the following is a specification.

This invention relates to certain new and useful improvements in locks for hub caps especially adapted for automobile wheels, the pecularities of which will be hereinafter described and claimed.

The object of my invention is to provide means to lock the hub cap of an automobile wheel for example to prevent access to the nut holding the wheel on the axle.

Figure 1:
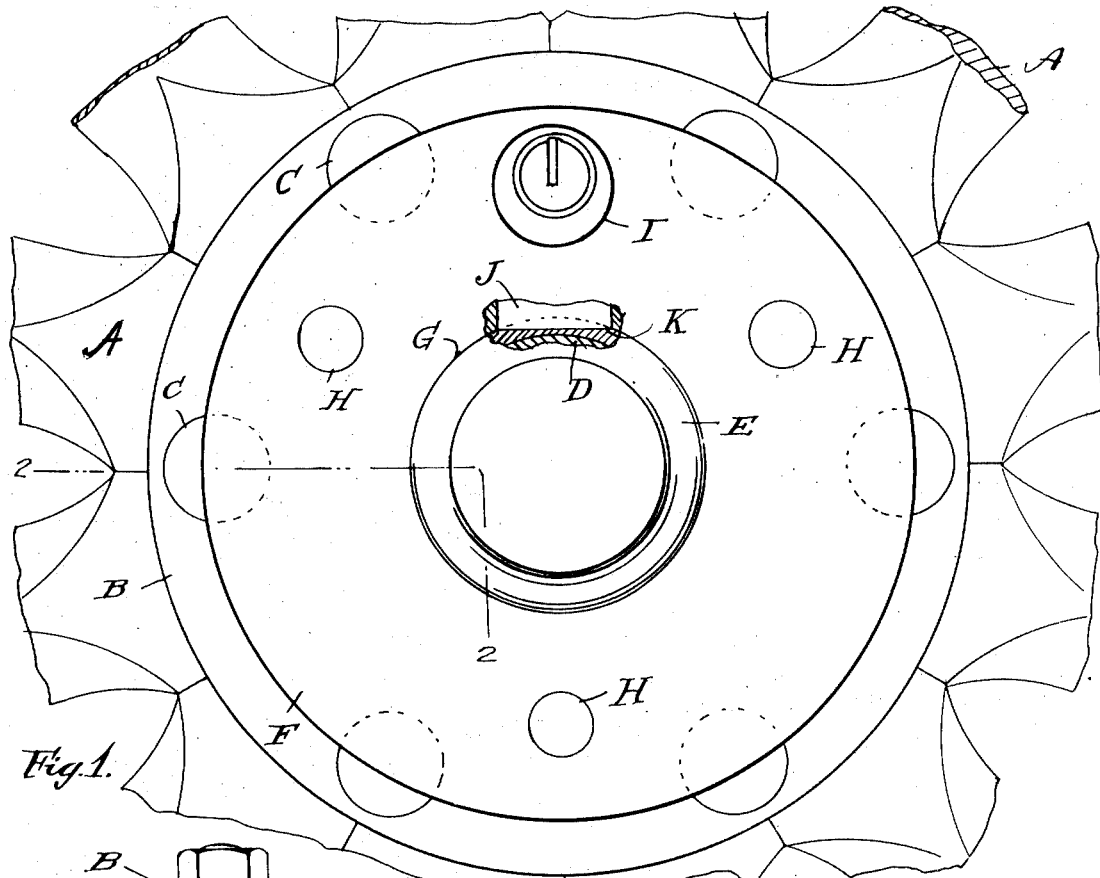
Figure 2:
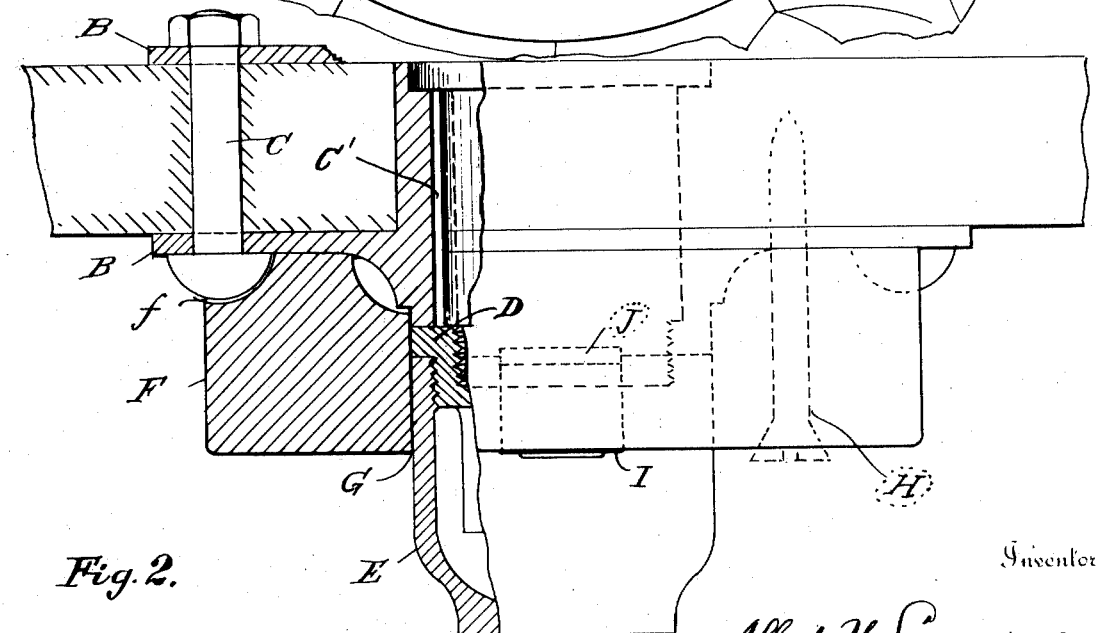

In the accompanying drawing on which like reference letters indicate corresponding parts, Figure 1 represents a face view of the central portion of a wheel with the spokes, and part of the lock casing broken away to show the construction; and Fig. 2 a vertical view of the same, partly in section on the line 2—2 of Fig. 1.

In the usual construction of automobile wheels, the spokes A are secured between side plates B—B fastened by bolts C. A castle-nut D secures the wheel which turns with and is fixed upon the axle (dotted) and full where key C′ rigidly connects wheel and axle, and on this nut is mounted by outer screw threads or otherwise a hub cap E as shown in the section portion of Fig. 2. This cap protects the nut D and gives a finish to the wheel, and must first be removed before the wheel can be taken from the axle. My device aims to lock this cap in its mounted position so that the cap cannot be removed to give access to the nut D without unlocking my device. In this way the unauthorized removal of the wheel is obstructed if not entirely prevented.

Referring to the drawing, a support for a key operated lock, such as a ring F having a central opening G designed to fit snugly over and embrace the hub cap E at its junction with the nut D, is secured to the side plate by any suitable fastening means, such as screws H that pass through drilled holes in the side plate and are countersunk in said ring F so that the outer portion of the head projects as indicated by dashed lines in Fig. 2. When the ring has been firmly secured upon the side plate the projecting portion of the screw head is filed off smooth as shown in Fig. 1 and the removal of the screw is prevented. Other means for securing the ring upon the hub may be employed.

Within the ring is an opening in which is mounted a lock I, preferably of the cylindrical style with revolving barrel, by which a key-operated bolt J is thrown downward toward the center opening of the ring and into engagement with the hub cap by means of a recess K filed across or otherwise formed on the outside portion of the hub cap at or near its junction with the nut D. This engagement is shown in Fig. 1 and indicated by dotted lines in Fig. 2, but may be otherwise as long as the locking engagement is effected between the locking bolt and the hub cap to prevent the turning of the latter until disengagement is made. The ring is preferably symmetrical and uniform, and in size according to that of the cap and depending on the lock carried by said ring, so that the appearance of the wheel will be uniform and attractive with my device applied thereto. The heads of fastening bolts C ordinarily used register with and fit into recesses *f* on the inner face of said ring as indicated in the drawings and assist the screws H in holding the ring in place on the outer hub plate.

Thus it is apparent that the hub cap E is protected and guarded by the ring F and its lock I mounted therein, so as to prevent the removal of the cap to give access to the nut D or other means for securing the wheel on the axle, except when the bolt J is disengaged from said cap. The locking bolt J is preferably actuated by a key in both directions.

I claim:

1. The combination with a wheel axle, a wheel hub turning with and fixed on said axle, an axle nut mounted on said axle and having outer threads also, and a cap screwed on the outside of said nut and having a recess formed in its outer portion near its junction with said nut, of a key-operated lock having a bolt adapted to be thrown into and out of said recess, and a support for said lock and carried by said hub adjacent to said cap.

2. The combination with an automobile wheel side plates, a hub cap having a flat recess on its outside portion and an axle and an axle nut, of a separate ring fastened to the outer of said side plates and embracing said hub cap, and a key operated lock mounted in said ring and having a bolt engaging said hub cap in locking position, and disengaged from said cap when said lock is unlocked, substantially as described.

3. A device of the character described comprising a ring member having recesses in the back adapted to register with bolt heads of an automobile wheel plate and interlock therewith, and having its center opening adapted to embrace a hub cap, and also having holes for fastening means, a lock mounted in said ring having a key-actuated bolt directed inward into said center opening for engagement with said cap when mounted on the outside of a wheel plate, and permanent fastening means for passing through the holes in said ring for securing said ring to the wheel plate adjacent to the hub cap for engagement of said bolt therewith, substantially as described.

In testimony whereof I have affixed my signature.

ALBERT W. SAEGESSER.